US012007086B2

(12) United States Patent
Tochadse

(10) Patent No.: US 12,007,086 B2
(45) Date of Patent: Jun. 11, 2024

(54) POLARITY CORRECTING CIRCUIT FOR LIGHT-EMITTING DIODE (LED) RETROFIT HEADLIGHT

(71) Applicant: LUMILEDS LLC, San Jose, CA (US)

(72) Inventor: Gennadi Tochadse, Aachen-Eilendorf (DE)

(73) Assignee: LUMILEDS LLC, San Jose, CA (US)

( * ) Notice: Subject to any disclaimer, the term of this patent is extended or adjusted under 35 U.S.C. 154(b) by 0 days.

(21) Appl. No.: 17/894,755

(22) Filed: Aug. 24, 2022

(65) Prior Publication Data

US 2023/0060280 A1 Mar. 2, 2023

Related U.S. Application Data

(60) Provisional application No. 63/236,543, filed on Aug. 24, 2021.

(51) Int. Cl.

| | |
|---|---|
| ***F21S 41/141*** | (2018.01) |
| ***F21V 23/06*** | (2006.01) |
| *F21Y 115/10* | (2016.01) |

(52) U.S. Cl.
CPC ............ *F21S 41/141* (2018.01); *F21V 23/06* (2013.01); *F21Y 2115/10* (2016.08)

(58) Field of Classification Search
CPC ............................... F21S 41/141; F21V 23/06
See application file for complete search history.

(56) References Cited

U.S. PATENT DOCUMENTS

| | | | | |
|---|---|---|---|---|
| 7,250,730 | B1 | 7/2007 | Allen | |
| 7,344,284 | B2 | 3/2008 | Lynam et al. | |
| 8,398,284 | B1 * | 3/2013 | Dvorzsak | B60Q 1/381 362/249.02 |
| D969,369 | S * | 11/2022 | Borgen | D26/28 |
| 11,490,484 | B1 * | 11/2022 | Lin | H05B 45/37 |
| 2009/0206762 | A1 | 8/2009 | Gibboney | |
| 2010/0181885 | A1 * | 7/2010 | Tessnow | F21S 43/14 313/1 |
| 2010/0213809 | A1 * | 8/2010 | Roehl | F21K 9/232 313/317 |
| 2016/0319999 | A1 * | 11/2016 | Elzinga | H01L 33/32 |

* cited by examiner

*Primary Examiner* — Christopher E Dunay
(74) *Attorney, Agent, or Firm* — Volpe Koenig

(57) ABSTRACT

A light emitting diode (LED) lamp, vehicle headlight system and vehicle headlight that are adapted for use with an electrical system of a vehicle that was designed for a conventional lamp-based headlight. To adapt to the electrical system designed a conventional lamp-based headlight, a correcting circuit is utilized that allows for LEDs to be powered irrespective of a polarity of a power signal provided by the vehicle.

17 Claims, 4 Drawing Sheets

POLARITY CORRECTING CIRCUIT FOR LIGHT-EMITTING DIODE (LED) RETROFIT HEADLIGHT

CROSS REFERENCE TO RELATED APPLICATIONS

This application claims the benefit of U.S. Provisional Patent Application No. 63/236,543, which was filed on Aug. 24, 2021, the contents of which are hereby incorporated by reference herein.

BACKGROUND

Light emitting diodes (LEDs), encompassing, for example, all semiconductor light emitting devices including diode lasers, are increasingly replacing older technology light sources, such as halogen, gas-discharge, and Xenon lamps (referred to herein as conventional lamps), due to superior technical properties, such as energy efficiency and lifetime. This is also true for demanding applications, such as in terms of luminance, luminosity, and/or beam shaping (e.g., as in vehicle headlighting). Considering the vast installation base of conventional lamps, it may be of great economic interest to provide so-called LED retrofit lamps (also referred to herein as LED retrofits), more or less one-to-one replacing conventional lamps while allowing continued use of other system components, such as optics (e.g., reflectors and lenses) and luminaires.

SUMMARY

A light emitting diode (LED) lamp, vehicle headlight system, and vehicle headlight that are adapted for use with an electrical system of a vehicle that was designed for a conventional lamp-based headlight. To adapt to the electrical system designed for a conventional lamp-based headlight, a correcting circuit is utilized that allows for LEDs to be powered irrespective of a polarity of a power signal provided by the vehicle.

BRIEF DESCRIPTION OF THE DRAWINGS

A more detailed understanding can be had from the following description, given by way of example in conjunction with the accompanying drawings wherein.

DETAILED DESCRIPTION

Figure 1:
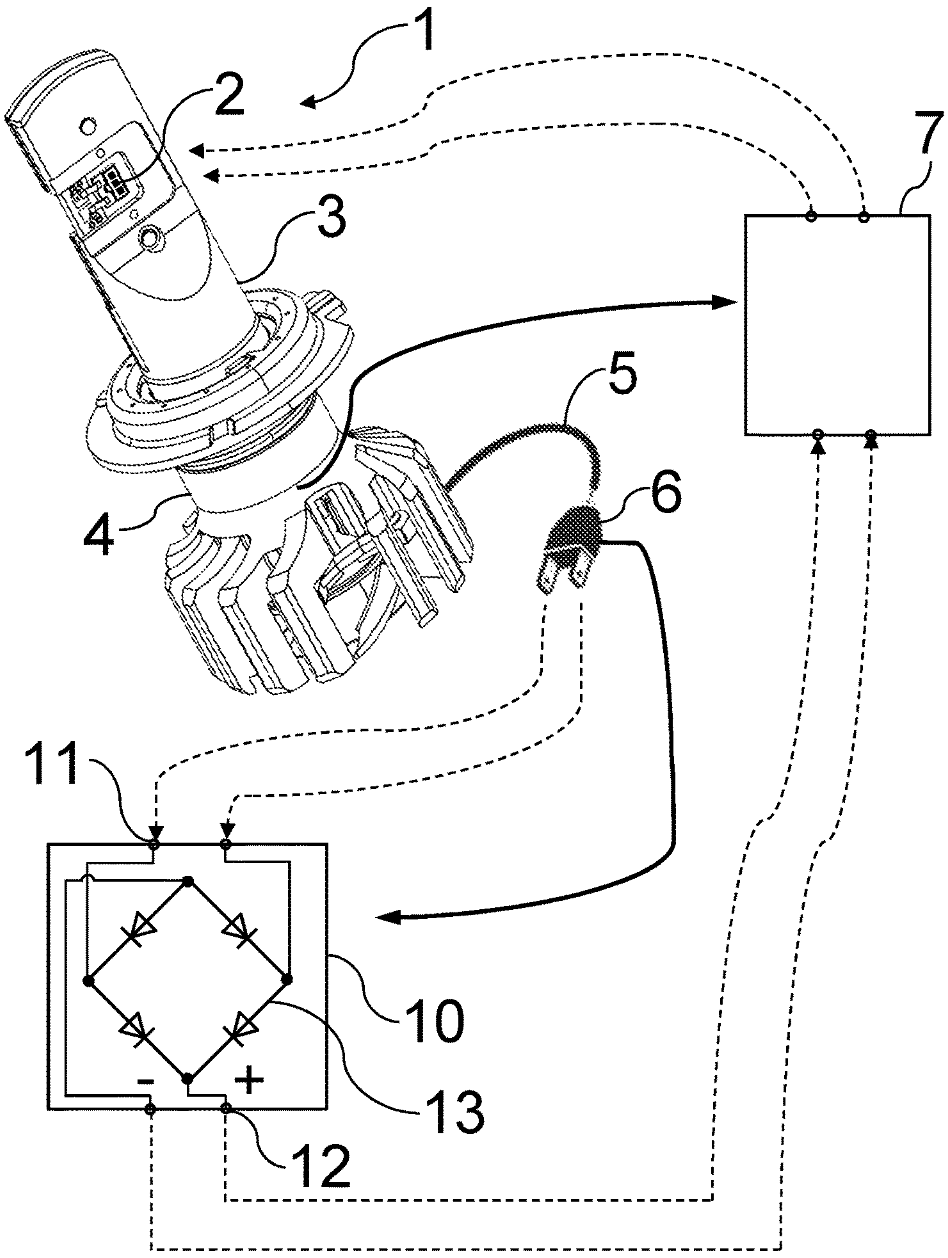
FIG. 1 is a perspective view of an LED retrofit and diagrammatic views of an example LED driver and polarity correcting circuit.

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

In replacing a conventional lamp, in addition to constraints, such as light technical data and space limitations, an LED retrofit has to be operable with the electrical power supply that the conventional lamp was connected to. As halogen lamps are insensitive to the current direction, the electrical connector of the vehicle to the halogen lamp typically has no orientation markings but can be plugged into the electrical contacts of the halogen lamp in any orientation. LEDs, however, are single-direction direct-current devices. Furthermore, LEDs for vehicle headlights are expected to deliver a defined constant amount of light requiring them to be operated by an LED driver functioning as a current source for delivering a constant current of a defined direction to the LEDs. Such LED drivers may basically be DC-DC converters conserving the current direction and thus may require a direct current (DC) power supply with the required current direction.

In conventional devices, the LED driver may be supplemented with a polarity correcting circuit immediately behind its input terminals. Such polarity correcting circuit may guarantee that, behind such circuit, there is always a defined current direction irrespective of the polarity of the current before the polarity correcting circuit. Technically, such polarity correcting circuits are similar to full-wave rectifier circuits (e.g., circuits rectifying both half waves of an alternating current (AC) input to a DC output with a defined current direction. A well-known example of such full-wave rectifier is a diode bridge (sometimes also called Graetz circuit or Graetz bridge) that may include four diodes connected in a rhombus shape with its input contacts at two opposing corners of the rhombus and its output contacts at the other two opposing corners of the rhombus; see https://en.wikipedia.org/wiki/Diode_bridge, which is hereby incorporated by reference herein.

The introduction of such a polarity correcting circuit into the LED drive may, thus, allow the connector of the vehicle to be plugged into the LED retrofit lamp in any orientation. As said, conventional devices have considered such circuit for achieving polarity insensitivity a part of the LED driver and, thus, bundled the polarity correcting circuit with the other parts of the LED driver into a single space.

FIG. 1 is a perspective view of an LED retrofit 1 and diagrammatic views of an example LED driver 7 and polarity correcting circuit 10. In the example illustrated in FIG. 1, the LED retrofit 1 comprises an LED lamp body 3 with LEDs 2 and a socket 4. The LED retrofit 1 may further include a power cord 5 with plug 6 to be electrically connected to the vehicle's board-net. For powering the LEDs 2, the LED retrofit 1 may include an LED driver 7, which may be integrated within the socket 4. The polarity correcting circuit 10 may be integrated into the plug 6 spaced apart from the LED driver 7. The polarity correcting circuit 10 may receive the board-net voltage via the pins of plug 6 at its input terminals 11 and output, by virtue of its diode bridge 13, a defined polarity DC voltage at its output terminals 12 to be input to LED driver 7. The LED driver 7 may use the defined polarity input to generate a constant current into the LEDs forward direction for LEDs 2.

Alternatively to placing the polarity correcting circuit 10 into the plug 6, it may be placed anywhere as long as it is spaced apart from the LED driver 7. In particular, the polarity correcting circuit 10 may also be mounted in its own housing, which may be referred to as a polarity correcting circuit body. Additionally, if the LED driver 7 is not integrated into the socket 4 of the LED lamp body 3 but is mounted in its own LED driver body apart from the LED lamp body 3, the polarity correcting circuit 10 may be mounted to the LED lamp body 3 and, in particular, may be integrated into the socket 4 of the LED lamp body 3.

Surprisingly, it was noted that, by placing the polarity correcting circuit 10 spaced apart from the LED driver 7, efficiency as well as lifetime of the LED driver 7 may be considerably improved. The polarity correcting circuit 10 may generate considerable waste heat, which, when placed near the LED driver 7, may combine with the waste heat of the LED driver 7. The combined heat may then increase the temperature of the driver elements, such as its power electronics components. Raised driver temperature, however, may reduce its efficiency and lifetime. Thus, placing the polarity correcting circuit 10 spaced apart from the LED driver 7 may avoid combining their waste heat.

Integrating the polarity correcting circuit 10 into plug 6 may yield a particularly efficient cooling of the polarity correcting circuit 10. Typically, plug 6, after installing the LED retrofit 1 in a vehicle, may be placed at a relatively cool space in the engine compartment of the vehicle. Moreover, the plug 6 may be further cooled via its pins, which may be plugged into a board-net socket of the vehicle. Additionally, with the plug 6 comprising no further heat generating components than the polarity correcting circuit 10, effective cooling may also be provided via heat conduction to the relatively large surface area of plug 6.

As depicted in FIG. 1, a possible implementation of the polarity correcting circuit 10 may use a full-wave rectifier diode bridge 13. This may provide a defined polarity DC voltage at the output terminals 12 of polarity correcting circuit 10 independent from the orientation the pins of plug 6 are plugged into the vehicle's board-net socket (e.g., independent from the orientation the input terminals 11 of the polarity correcting circuit 10 are connected to the board-net of the vehicle). In other instances, the polarity correcting circuit 10 may incorporate a inverting buck-boost circuit.

An advantageous use of a disclosed LED retrofit lamp may be within a vehicle headlight further comprising a lamp fixture for receiving the LED retrofit.

Figure 2:
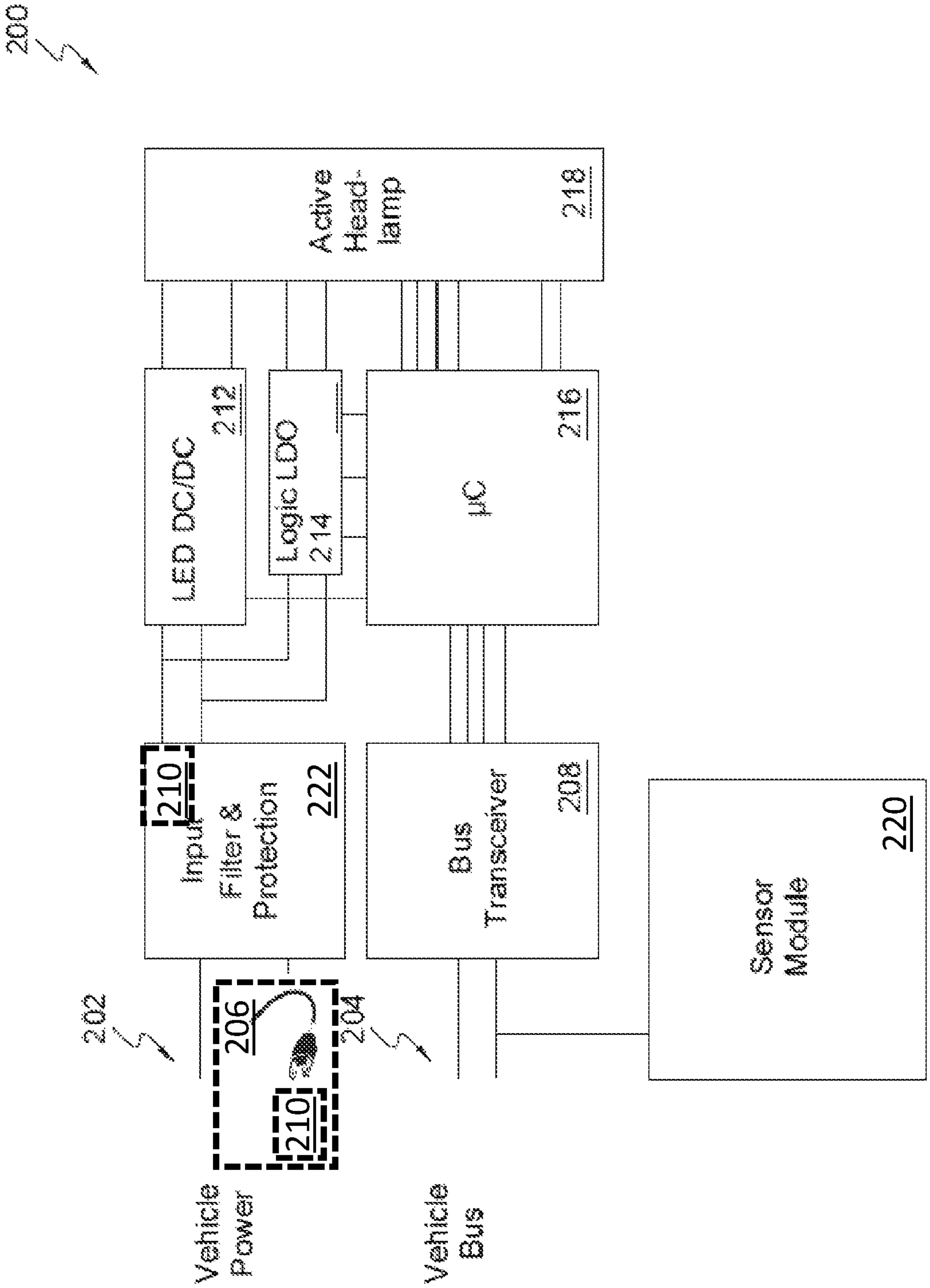
FIG. 2 is a diagram of an example vehicle headlamp system.

FIG. 2 is a diagram of an example vehicle headlamp system 200 that may incorporate one or more of the embodiments and examples described herein. The example vehicle headlamp system 200 illustrated in FIG. 2 includes power lines 202, a data bus 204, an input filter and protection module 222, a bus transceiver 208, a sensor module 220, an LED direct current to direct current (DC/DC) module 212, a logic low-dropout (LDO) module 214, a micro-controller 216 and an active head lamp 218.

The power lines 202 may have inputs that receive power from a vehicle, and the data bus 204 may have inputs/outputs over which data may be exchanged between the vehicle and the vehicle headlamp system 200. For example, the vehicle headlamp system 200 may receive instructions from other locations in the vehicle, such as instructions to turn on turn signaling or turn on headlamps, and may send feedback to other locations in the vehicle if desired. In some instances, the vehicle headlamp system 200 may be connected to the vehicle power via plug 206. In some instances, the plug 206 may be electrically connected to the vehicle's board-net in order to connect to the power lines 202.

The sensor module 220 may be communicatively coupled to the data bus 204 and may provide additional data to the vehicle headlamp system 200 or other locations in the vehicle related to, for example, environmental conditions (e.g., time of day, rain, fog, or ambient light levels), vehicle state (e.g., parked, in-motion, speed of motion, or direction of motion), and presence/position of other objects (e.g., vehicles or pedestrians). A headlamp controller that is separate from any vehicle controller communicatively coupled to the vehicle data bus may also be included in the vehicle headlamp system 200. In FIG. 2, the headlamp controller may be a micro-controller, such as micro-controller (μc) 216. The micro-controller 216 may be communicatively coupled to the data bus 204.

The input filter and protection module 222 may be electrically coupled to the power lines 202 and may, for example, support various filters to reduce conducted emissions and provide power immunity. Additionally, the input filter and protection module 222 may provide electrostatic discharge (ESD) protection, load-dump protection, alternator field decay protection, and/or reverse polarity protection. In some instances, the input filter and protection model 222 may include polarity correcting circuit 210. The polarity correcting circuit 210 may use a full-wave rectifier diode as depicted in FIG. 1. This may provide a defined polarity DC output that is provided to the LED DC/DC 212 and/or the Logic LDO 214 independent from the orientation or a polarity of a power signal provided by the vehicle power over powerlines 202.

In some instances, the polarity correcting circuit 210 may be integrated into the plug 206. Moreover, the plug 206 may be further cooled via its pins, which may be plugged into a board-net socket of the vehicle. Additionally, with the plug 206 comprising no further heat generating components than the polarity correcting circuit 210, effective cooling may also be provided via heat conduction to the relatively large surface area of plug 206.

The LED DC/DC module 212 may be coupled between the input filter and protection module 222 and the active headlamp 218 to receive filtered power and provide a drive current to power LEDs in the LED array in the active headlamp 218. The LED DC/DC module 212 may have an input voltage between 7 and 18 volts with a nominal voltage of approximately 13.2 volts and an output voltage that may be slightly higher (e.g., 0.3 volts) than a maximum voltage for the LED array (e.g., as determined by factor or local calibration and operating condition adjustments due to load, temperature or other factors).

The logic LDO module 214 may be coupled to the input filter and protection module 222 to receive the filtered power. The logic LDO module 214 may also be coupled to the micro-controller 216 and the active headlamp 218 to provide power to the micro-controller 216 and/or electronics in the active headlamp 218, such as CMOS logic.

The bus transceiver 208 may have, for example, a universal asynchronous receiver transmitter (UART) or serial peripheral interface (SPI) interface and may be coupled to the micro-controller 216. The micro-controller 216 may translate vehicle input based on, or including, data from the sensor module 220. The translated vehicle input may include a video signal that is transferrable to an image buffer in the active headlamp 218. In addition, the micro-controller 216 may load default image frames and test for open/short pixels during startup. In embodiments, an SPI interface may load an image buffer in CMOS. Image frames may be full frame, differential or partial frames. Other features of micro-controller 216 may include control interface monitoring of CMOS status, including die temperature, as well as logic LDO output. In embodiments, LED DC/DC output may be dynamically controlled to minimize headroom. In addition to providing image frame data, other headlamp functions, such as complimentary use in conjunction with side marker or turn signal lights, and/or activation of daytime running lights, may also be controlled.

Figure 3:
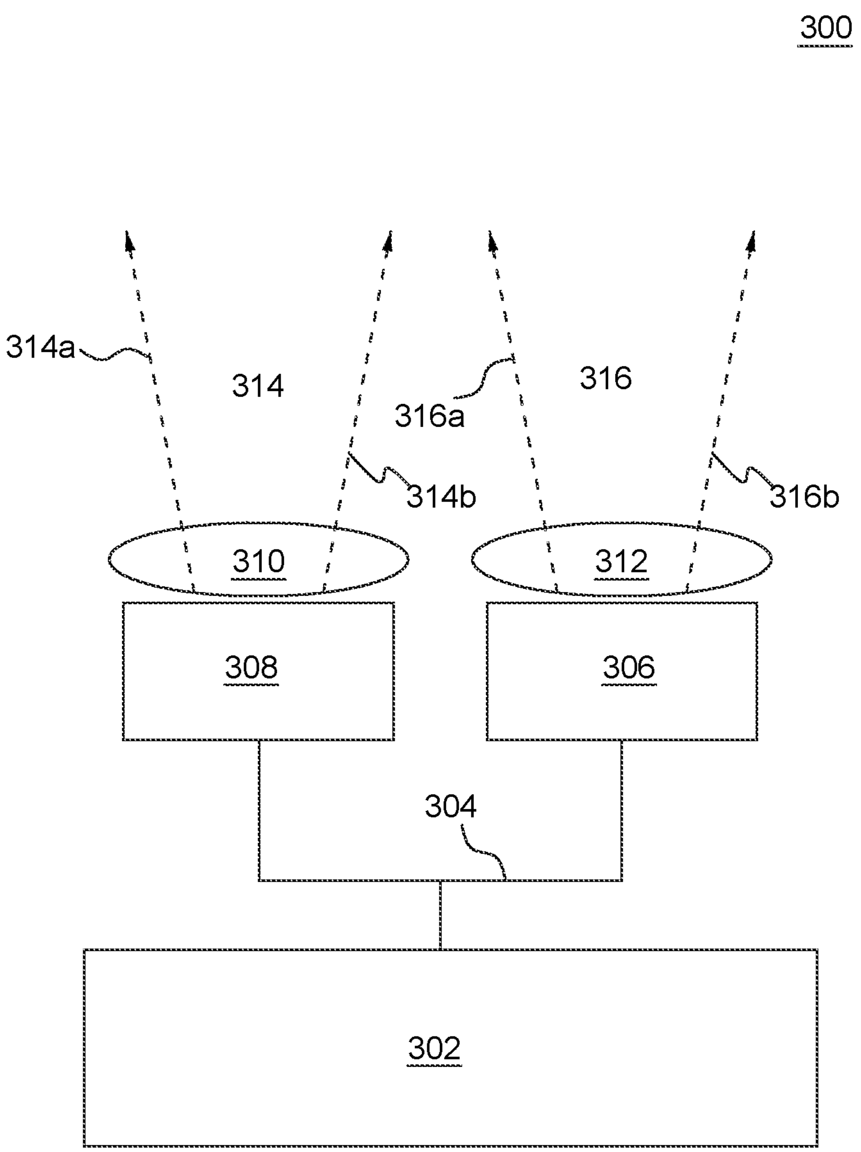
FIG. 3 is a diagram of another example vehicle headlamp system.

FIG. 3 is a diagram of another example vehicle headlamp system 300. The example vehicle headlamp system 300 illustrated in FIG. 3 includes an application platform 302, two LED lighting systems 306 and 308, and secondary optics 310 and 312.

The LED lighting system 308 may emit light beams 314 (shown between arrows 314*a* and 314*b* in FIG. 3). The LED lighting system 306 may emit light beams 316 (shown between arrows 316*a* and 316*b* in FIG. 3). In the embodiment shown in FIG. 3, a secondary optic 310 is adjacent the LED lighting system 308, and the light emitted from the LED lighting system 308 passes through the secondary optic 310. Similarly, a secondary optic 312 is adjacent the LED lighting system 306, and the light emitted from the LED lighting system 306 passes through the secondary optic 312. In alternative embodiments, no secondary optics 310/312 are provided in the vehicle headlamp system.

Where included, the secondary optics 310/312 may be or include one or more light guides. The one or more light guides may be edge lit or may have an interior opening that defines an interior edge of the light guide. LED lighting systems 308 and 306 may be inserted in the interior openings of the one or more light guides such that they inject light into the interior edge (interior opening light guide) or exterior edge (edge lit light guide) of the one or more light guides. In embodiments, the one or more light guides may shape the light emitted by the LED lighting systems 308 and 306 in a desired manner, such as, for example, with a gradient, a chamfered distribution, a narrow distribution, a wide distribution, or an angular distribution.

The application platform 302 may provide power and/or data to the LED lighting systems 806 and/or 808 via lines 804, which may include one or more or a portion of the power lines 202 and the data bus 204 of FIG. 2. One or more sensors (which may be the sensors in the vehicle headlamp system 300 or other additional sensors) may be internal or external to the housing of the application platform 302. Alternatively, or in addition, as shown in the example vehicle headlamp system 200 of FIG. 2, each LED lighting system 308 and 306 may include its own sensor module, connectivity and control module, power module, and/or LED array.

In embodiments, the vehicle headlamp system 300 may represent an automobile with steerable light beams where LEDs may be selectively activated to provide steerable light. For example, an array of LEDs or emitters may be used to define or project a shape or pattern or illuminate only selected sections of a roadway. In an example embodiment, infrared cameras or detector pixels within LED lighting systems 306 and 308 may be sensors (e.g., similar to sensors in the sensor module 220 of FIG. 2) that identify portions of a scene (e.g., roadway or pedestrian crossing) that require illumination.

Figure 4:
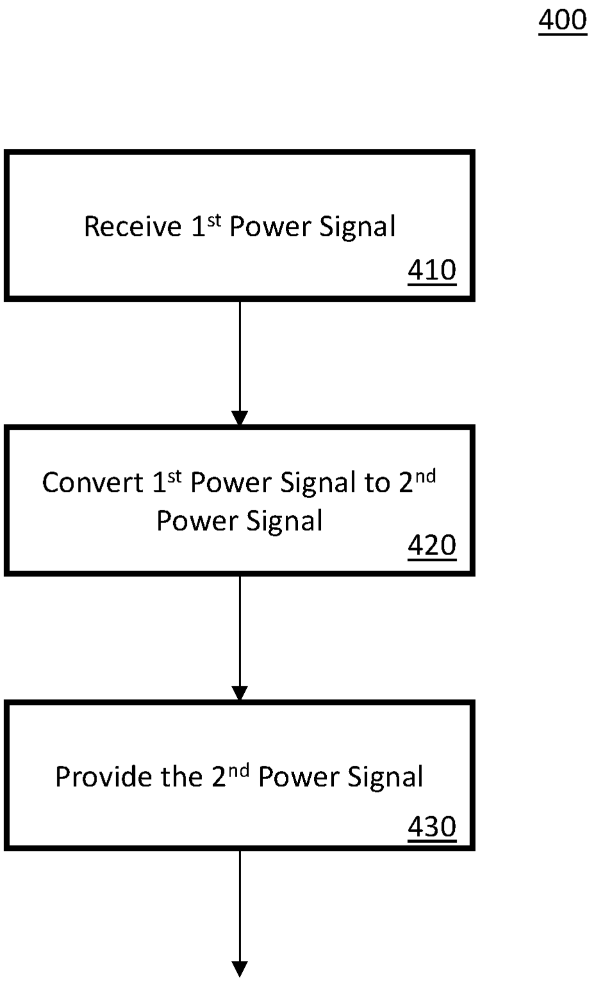
FIG. 4 is flow diagram for an example method implementing an LED retrofit with a polarity correcting circuit.

FIG. 4 is flow diagram that illustrates an example method 400 that enables LEDs to be utilized with an electrical system of a vehicle that is designed for a conventional lamp-based headlight. In step 410, the polarity correcting circuit 10 receives a first power signal from the electrical systems of the vehicle. In some instances, the first power signal is received via plug 6. Then in step 420, the polarity correcting circuit 10 converts the first power signal into a second power signal. In many instances, the first power signal and the second power signal have a different polarity. Next, in step 430, the polarity correcting circuit 10 provides the second power signal to the circuitry that controls the LEDs. For example, in some instances, in step 430, the polarity correcting circuit 10 provides the second power signal to LED driver 7. In other instances, in step 430, the polarity correcting circuit 10 provides the second power signal to LED direct current to direct current (DC/DC) module 212.

As would be apparent to one skilled in the relevant art, based on the description herein, embodiments of the present invention can be designed in software using a hardware description language (HDL) such as, for example, Verilog or VHDL. The HDL-design can model the behavior of an electronic system, where the design can be synthesized and ultimately fabricated into a hardware device. In addition, the HDL-design can be stored in a computer product and loaded into a computer system prior to hardware manufacture.

Having described the embodiments in detail, those skilled in the art will appreciate that, given the present description, modifications may be made to the embodiments described herein without departing from the spirit of the inventive concept. Therefore, it is not intended that the scope of the invention be limited to the specific embodiments illustrated and described.

What is claimed is:

1. A light emitting diode (LED) lamp, the LED lamp comprising:

a lamp body that includes a plurality of LEDs, the lamp body having a base;

an LED driver that controls the plurality of LEDs and is integrated into the base;

a power cord having a first end and a second end that are electrically coupled and separated by a length, wherein the first end electrically couples to the LED driver;

a plug formed on and electrically coupled to the second end of the power cord, wherein the plug is electrically connectable to an electrical system of a vehicle and the length of the power cord spaces the plug away from the lamp body; and a correcting circuit, integrally formed in the plug, that receives a first power signal from the electrical system of the vehicle via the plug and converts the first power signal into a second power signal that is provided to the LED driver.

2. The LED lamp of claim 1, wherein the plug comprises pins that cool the correcting circuit via conduction.

3. The LED lamp of claim 1, wherein the first power signal and the second power signal have a different polarity.

4. The LED lamp of claim 1, wherein the correcting circuit includes a diode bridge.

5. The LED lamp of claim 1, wherein the correcting circuit includes an inverting buck-boost circuit.

6. The LED lamp of claim 1, wherein the plug is adapted to connect to a non-polarized socket.

7. A vehicle headlight system, the vehicle headlight system comprising:

an LED DC/DC module that provides drive current to a plurality of LEDs;

a power cord having a first end and a second end that are electrically coupled and separated by a length, wherein the first end electrically couples to the LED DC/DC module;

a plug formed on and electrically coupled to the second end of the power cord, wherein the plug is electrically connectable to an electrical system of a vehicle and the length of the power cord spaces the plug apart from the LED DC/DC module; and a correcting circuit, integrally formed in the plug, that receives a first power signal from the electrical system of the vehicle via the plug and converts the first power signal into a second power signal that is provided to the LED DC/DC module.

8. The vehicle headlight system of claim 7, wherein the plug comprises pins that cool the correcting circuit via conduction.

9. The vehicle headlight system of claim 7, wherein the first power signal and the second power signal have a different polarity.

10. The vehicle headlight system of claim 7, wherein the correcting circuit includes a diode bridge.

11. The vehicle headlight system of claim 7, wherein the correcting circuit includes an inverting buck-boost circuit.

12. The vehicle headlight system of claim 7, wherein the plug is adapted to connect to a non-polarized socket.

13. A light emitting diode (LED) headlight, the LED headlight comprising:

a lamp fixture that is adapted to integrate into an exterior of a vehicle;

one or more optical components that are mechanically coupled to the lamp fixture and project light emitted a plurality of LEDs;

a lamp body that includes the plurality of LEDs and mechanically couples to the headlight housing, the lamp body having a base;

an LED driver that controls the plurality of LEDs and is integrated into the base;

a power cord having a first end and a second end that are electrically coupled and separated by a length, wherein the first end electrically couples to the LED driver;

a plug that is formed on and electrically coupled to the second end of the power cord, wherein the plug is electrically connectable to an electrical system of the vehicle and the length of the power cord spaces the plug away from the lamp body; and a correcting circuit, integrally formed in the plug, that receives a first power signal from the electrical system of the vehicle via the plug and converts the first power signal into a second power signal that is provided to the LED driver.

14. The LED headlight of claim 13, wherein the plug comprises pins that cool the correcting circuit via conduction.

15. The LED headlight of claim 13, wherein the first power signal and the second power signal have a different polarity.

16. The LED headlight of claim 13, wherein the correcting circuit includes a diode bridge.

17. The LED headlight of claim 13, wherein the plug is adapted to connect to a non-polarized socket.

* * * * *